United States Patent [19]

Greenberg et al.

[11] 4,258,385

[45] Mar. 24, 1981

[54] INTERACTIVE VIDEO PRODUCTION SYSTEM AND METHOD

[75] Inventors: George A. Greenberg, Los Angeles; Wayne Duncan, Beverly Hills, both of Calif.

[73] Assignee: Combined Logic Company, Beverly Hills, Calif.

[21] Appl. No.: 39,184

[22] Filed: May 15, 1979

[51] Int. Cl.³ .......................................... H04N 9/535
[52] U.S. Cl. .......................................... 358/22; 358/8; 358/80
[58] Field of Search .................... 358/30, 22, 8, 4, 81, 358/82, 78, 80

[56] References Cited

U.S. PATENT DOCUMENTS

| | | | |
|---|---|---|---|
| Re. 29,787 | 9/1978 | Bargen | 358/4 |
| 3,512,094 | 5/1970 | Dann | 358/4 |
| 3,617,626 | 11/1971 | Bluth | 358/4 |
| 3,717,725 | 2/1973 | Numakura | 358/4 |
| 3,739,078 | 6/1973 | Pugsley | 358/80 |
| 3,835,245 | 9/1974 | Pieters | 358/93 |
| 3,899,662 | 8/1975 | Kreeger | 358/903 |
| 3,904,816 | 9/1975 | Taudt | 358/80 |
| 3,949,416 | 4/1976 | Stalley | 358/8 |
| 3,969,757 | 7/1976 | Amery | 358/4 |
| 3,997,912 | 12/1976 | Zsagar | 358/78 |
| 4,000,510 | 12/1976 | Cheney | 358/903 |
| 4,017,680 | 4/1977 | Anderson | 358/903 |
| 4,026,555 | 5/1977 | Kirschner | 273/85 R |
| 4,060,829 | 11/1977 | Sakamoto | 358/80 |
| 4,096,523 | 6/1978 | Belmares-Sarabia | 358/80 |
| 4,122,489 | 10/1978 | Bolger | 358/8 |

OTHER PUBLICATIONS

Comtal-Vision one/20, author unkown, date unknown.

*Primary Examiner*—Benedict V. Safourek
*Assistant Examiner*—Michael A. Masinick
*Attorney, Agent, or Firm*—Hubbell, Cohen, Stiefel & Gross

[57] ABSTRACT

The present invention relates to video production systems and methods and particularly to such systems and methods in which the video characteristics of the video frames may be interactively controlled during video production.

36 Claims, 2 Drawing Figures

INTERACTIVE VIDEO PRODUCTION SYSTEM AND METHOD

DESCRIPTION OF THE PRIOR ART

Video production systems are well known in which video information stored on conventional storage devices, such as analog video tape recorders, is processed in order to edit or treat the information so as to enhance the prerecorded information in the manner desired by the user. Such prior art video production systems known to applicants, however, are limited in that the prerecorded information can only be treated on a frame by frame basis in which the entire video frame of information must be treated. Thus, for example, if it is desired to change the coloration of a given video frame, the coloration of the entire frame must be modified. Thus, if it is desired to increase the red contained in a particular portion of an image of the frame, the entire frame must experience the red color change which increases the coloration of each of the portions of the entire video image by the inclusion of the additional red color change.

This has generally proven unsatisfactory and accordingly, matte techniques have been applied so as to attempt to limit the coloration to only the portions of the image desired. These matte techniques, however, are also limited, such as where they are employed to modify video images in real time in which a plurality of changes are desired in the frame. In addition, in applying such prior art matte techniques, as the portion of the image which is being treated moves in real time the matte or mattes employed must correspondingly move. This creates limitations on this technique when it is desired to process a rapidly changing scene as well as under other conditions. Accordingly, although such matte techniques are satisfactory for certain applications, they have limitations in other areas which have prevented the wide spread acceptance of such an approach as a viable method of specific color correction for portions of a video frame. In addition, another limitation on such prior art matte techniques is that if the video image being treated has a complex shape, considerable difficulty occurs in generating the matte to be used in treating such an image. For the above reasons, as well as others, prior art matte techniques have generally not enjoyed wide scale popularity in video production but rather have been limited to film production and optical printing.

It has also been known in the prior art to digitize video information. However, generally these techniques have not been applied to video production on a wide scale. An example of a digital video production system is the Ampex ESS-2; however, such a prior art digital production system does not employ real time interaction and, moreover, treats the composite video signal as an entity rather than separately processing its various color video components. This prior art digital video production system, however, is strictly a recording and playback device and does not enable pixel by pixel interaction with the video images. Thus, the limitations previously described in the prior art are not resolved by this type of system.

Another type of prior art digital image processing system is the type commercially available from Comtal Corporation of Pasadena, California and distributed under the designation Vision ONE/20. This system is a real time interactive modular system which provides stand alone full feature image processing as well as the option of interfacing to numerous host computers. However, the prior art Comtal system is an image analysis system as well as an image enhancement system and has not been employed in video production. Accordingly, such system is not designed to handle real time interactive video production. For example, the information processed is processed in a 1:1 aspect ratio of previously digitized images, such as provided from a host computer, although the Comtal Vision ONE/20 does have a video digitizer option in which black and white video information may be provided to the system for processing in a 1:1 aspect ratio format, such as for graphic image treatment. In addition, the Comtal processor, since it provides processing on a 1:1 aspect ratio, treats the digital image on a 256 by 256, 512 by 512, or 1024 by 1024 active pixel basis. Thus, although the commercially available Comtal system is satisfactory for many applications it is not satisfactory for real time interactive video production at the video frame rate.

In addition to the above, it is well known in the prior art to modify color video information on a frame by frame basis, such as disclosed in U.S. Pat. Nos. 4,096,523 or Re. 29,787, although these prior art systems do not accomplish such modification on a pixel by pixel basis. There are also prior art image analysis systems in which a color video signal is digitized for image analysis such as disclosed in U.S. Pat. Nos. 3,835,245 and 3,739,078. Other prior art color video treatment systems known to applicants which enable treatment of a color video signal, although not on an active pixel by pixel basis and not enabling real time interactive control of such information treatment on a pixel by pixel basis, are disclosed, by way of example, in U.S. Pat. Nos. 4,017,680; 3,617,626; 3,904,816; 4,026,555; 4,000,510; 3,512,094; 4,060,829; 3,997,912; 3,899,662; 4,122,489; 3,949,416 and 3,969,757.

Thus, although the digitizing of video data for video image treatment is known in the prior art, as is the color modification of video information on a frame by frame basis, and the dot by dot control of static color separation images, there are no prior art systems known to applicants in which real time interactive video production treatment of video images provided at a real time video frame rate is accomplished on a active pixel by pixel basis, nor are there any prior art systems known to applicants in which a single frame of video may be interacted with in real time on a pixel by pixel basis. These disadvantages of the prior art are overcome by the system and method of the present invention.

SUMMARY OF THE INVENTION

An interactive video production system and method is provided in which an analog video storage means, such as an analog video tape recorder, capable of retrievably storing a composite analog color video signal, such as a composite analog color video signal having red, blue and green analog video components and having an associated video information content, retrievably provides this composite analog color video signal as a video output signal at a real time video frame rate for digital video image processing in a 4:3 aspect ratio configuration of active pixels on a real time interactive basis so as to enable the video characteristics of the active pixels forming each video frame to be interactively controlled during video production. Decoding means are provided for decoding the composite color video output of the analog video storage device into red, blue and green analog video components before provision to the digital video image processor. These decoded red, blue and green analog video components are digitized and are separately digitally processed in the previously mentioned 4:3 aspect ratio configuration of active pixels with the red, blue and green video components being simultaneously processed. The real time interactive control of the digital video image processing may be accomplished by a keyboard, by a data tablet or by a track ball or by any other conventional interactive device or combination thereof. The digital video image processor thereafter provides the digitally processed red, blue and green video component signals as separate processed analog signals which are subsequently encoded and combined into a processed composite color video analog signal. It is this processed composite color video analog signal which is the end product of the video production process and system. The encoding of the processed signal can occur in a separate encoding device. Preferably, the decoding is such as to provide an NTSC decoded output and the encoding is such as to provide an NTSC encoded output. Moreover, the NTSC encoded output is preferably a compatible video output signal having an associated 4:3 aspect ratio picture, such as one comprising 525 total scan lines at a video frame rate of 30 frames per second.

The presently preferred system may also include a digital video storage device, such as an Ampex ESS-2, for retrievably storing single video frames of a composite video signal for subsequent single processing in the manner described above with respect to multi-frame processing. The system also preferably includes a video switcher connected between the analog and digital storage devices and the encoding and decoding devices for enabling control of the routing of the various video signals in the system and, moreover, may provide a sync reference for the video production system. As used throughout the description and claims, the term video production is used in its broadest sense and is meant to include production and post-production as commonly used in the industry. In this regard, the system may also preferably include a color video camera for providing live color video information to the system which may be treated in the same manner as previously described with respect to prerecorded information to enable real time interactive control of this information on an active pixel by pixel basis. In order to facilitate the aforementioned video production, a separate annotation command display and image processing monitor are provided in the presently preferred system so that during processing the user can view the actual image unobscured by any additional information in the picture. In this manner, the user can view the processed video image which is being treated and subsequently recorded as it will subsequently appear during normal video transmission of this information. Thus, as stated above, an analog composite color video signal is decoded into its red, blue and green color video components, digitized, with each of the color components being simultaneously processed in a 4:3 aspect ratio configuration of active pixels, is interacted with in real time, such as at the video frame rate, during the video production process, is then converted back into separate red, blue and green analog components which have now been digitally processed, is then encoded, and is then recombined into a composite analog color video signal in which the video characteristics of the active pixels forming each video frame have been interactively controlled during video production.

DETAILED DESCRIPTION OF PREFERRED EMBODIMENTS

Figure 1:
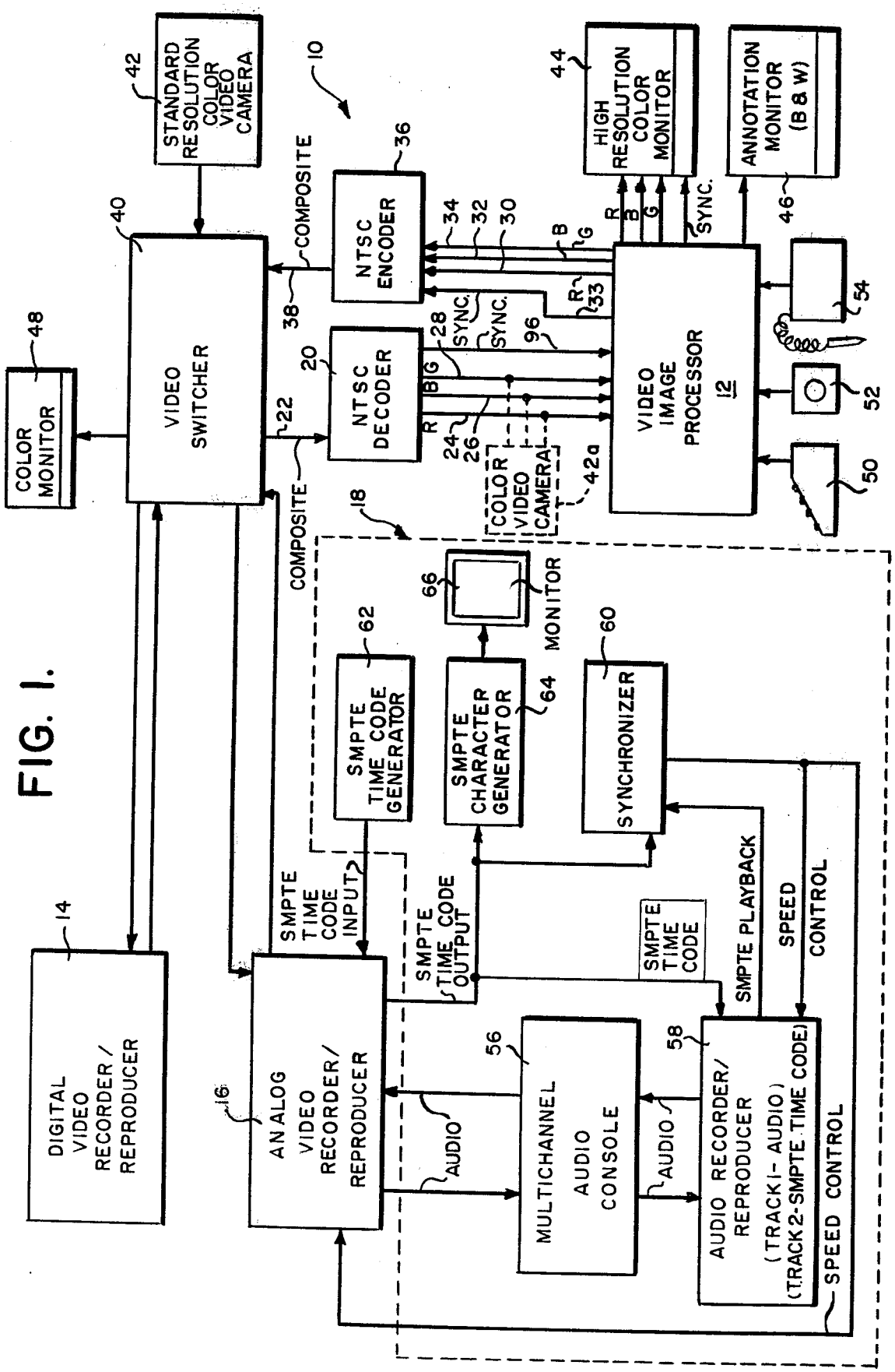
FIG. 1 is a block diagram of the presently preferred system configuration of the present invention which may be employed in practicing the presently preferred method of the present invention.

Referring now to the drawings in detail and initially to FIG. 1 thereof, the presently preferred interactive video production system of the present invention, generally referred to by the reference numeral 10, is shown. As shown and preferred, the system 10 includes a video image processor 12, to be described in greater detail hereinafter with reference to FIG. 2. The system 10 also preferably includes a conventional digital video recorder/reproducer 14, such as commercially available from Ampex under the designation Ampex ESS-2 Digital Video Production System, for enabling single frame video production, as will be described in greater detail hereinafter. In addition, the system 10 also includes a conventional analog video recorder/reproducer 16, such as an Ampex VPR-2 Video Production Recorder, for enabling real time multi-frame video production at the video frame rate, as will also be described in greater detail hereinafter. The system 10 also preferably includes an audio subsystem, generally referred to by the reference numeral 18, which maintains the synchronization between the audio and video portions of the video information recorded on the analog video recorder/reproducer 16. This audio subsystem 18, which is preferably a conventional synchronization system, will be described in greater detail hereinafter.

Figure 2:
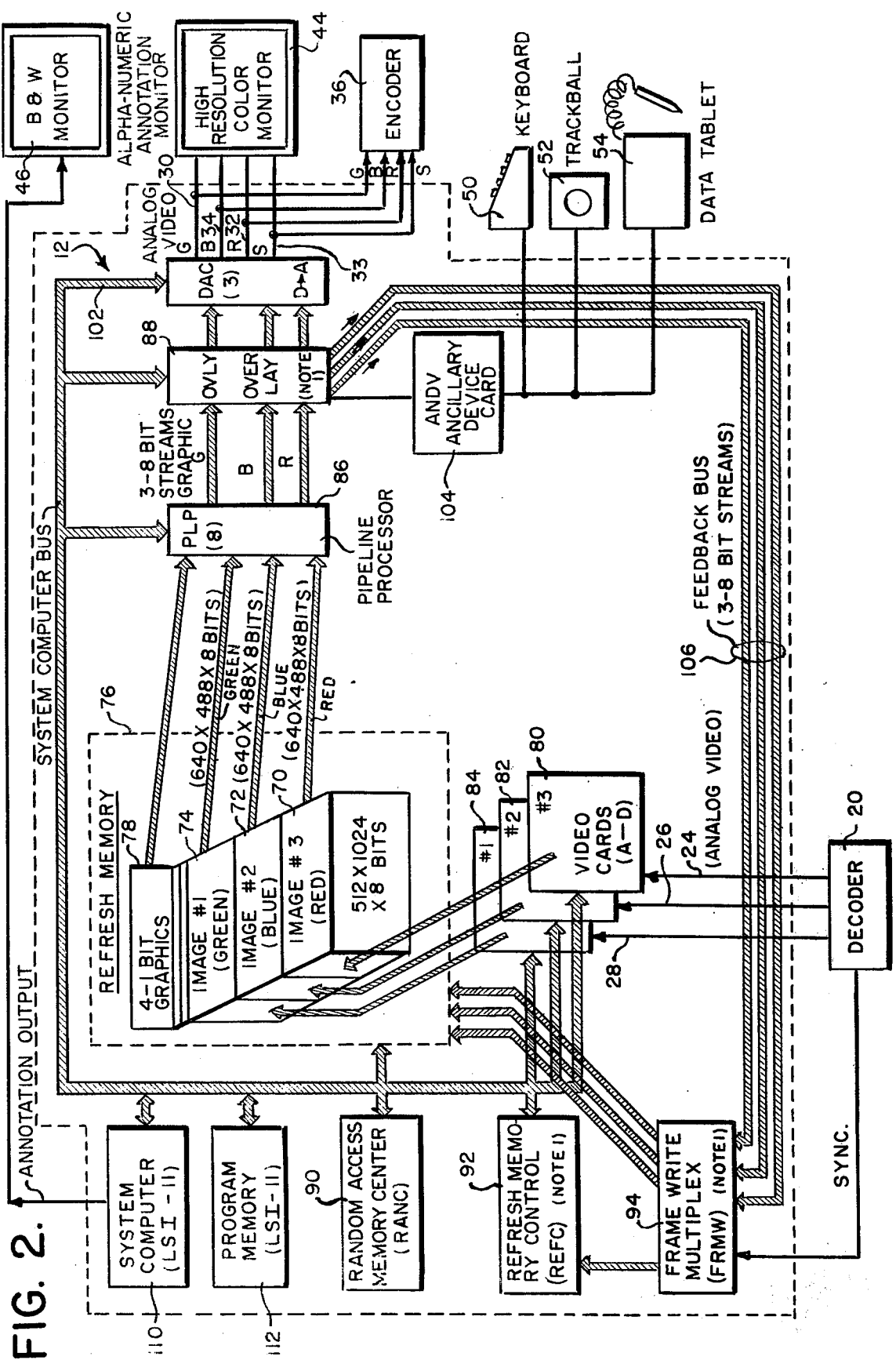
FIG. 2 is a block diagram, partially diagrammatic, of the presently preferred digital video image processing portion of the system of FIG. 1.

The system 10 also preferably includes an NTSC conventional decoder, such as a LENCO NTSC Chroma Decoder Model No. PCD363, generally referred to by reference numeral 20, for decoding a composite color video signal provided to the input thereof via path 22 into its analog red, blue and green color video and sync components which are provided as analog video output signals via paths 24, 26 and 28, and as sync via path 96, to the inputs of the digital video image processor 12, as will be described in greater detail hereinafter with reference to FIG. 2. As is further shown and preferred in FIG. 1, and as will also be described in greater detail hereinafter with reference to FIG. 2, after the video information is processed in processor 12, the processed red, blue and green color video component signals are converted into their analog equivalents and provided as processed analog output signals, and sync, via paths 30, 32, 34 and 33, respectively, to the input of a conventional NTSC encoder 36, such as a LENCO NTSC Encoder Model No. CEC810. The output of the encoder 36 is a composite analog processed color video signal provided via path 38 to one input of a conventional video switcher 40, such as Duca-Richardson Corporation DRC Series 4000 Video Switching System. This video switcher 40 also is operatively connected to the digital video recorder/reproducer 14, the analog video recorder/reproducer 16 and the NTSC decoder 20 in order to enable the controllable routing of video signals throughout the interactive video production system 10 of the present invention.

As is also shown and preferred in FIG. 1, the video switcher 40 is operatively connected to a conventional standard resolution color video camera 42, such as an Ampex BCC-14, for providing a live composite color video signal input to the system 10. This live composite color video signal input, as will be described in greater detail hereinafter, is routed through the NTSC decoder 20 in the same manner as the previously described analog video signals retrievably stored in the analog video recorder/reproducer 16. However, if desired, a conventional color video camera could be employed which directly provides red, blue and green color video component signals as the outputs thereof in which instance the NTSC decoder 20 may be bypassed and these signals provided directly to the inputs of the image processor 12 via paths 24, 26 and 28. Such an arrangement is illustrated by the dotted lines in FIG. 1 with such a conventional color video camera being given reference numeral 42a.

As further shown and preferred in FIG. 1, the system 10 also preferably includes a separate high resolution conventional color monitor 44 and a conventional annotation monitor 46, which is preferably a black and white type of conventional monitor. Lastly, as shown and preferred in FIG. 1, the system 10 also preferably includes another conventional color monitor 48, such as one commercially available from Conrac, which is operatively connected to the video switcher 40 for monitoring the video information being routed through the video switcher 40. As will be described in greater detail hereinafter with reference to FIG. 2, the system 10 also preferably includes real time interactive controls for the video image processor 12, such as a conventional keyboard 50, a conventional track ball 52, and a data tablet 54 which is preferably arranged to have a 4:3 aspect ratio rather than the more standard 1:1 aspect ratio. If desired, other conventional real time interactive devices may be employed with the video image processor 12 to provide real time interactive control thereof. In addition, although a keyboard 50, a track ball 52 and a data tablet 54 are illustrated in FIGS. 1 and 2, any combination thereof may be employed in the system 10 of the present invention.

With respect to the previously referred to audio subsystem 18, this subsystem 18 preferably includes a conventional configuration of an audio console 56, such as a Trident Fleximix console, a conventional audio deck 58, such as an Ampex ATR-100 which is a two track audio deck having audio on one track and SMPTE time code recorded on the other track, a conventional synchronizer 60 such as the EECO MQS-100 synchronizer, a conventional edit code generator 62, such as the EECO MTG-550, a conventional video character generator 64, such as an EECO BE-400, and an associated conventional black and white monitor 66 for displaying the time code information if desired. This configuration, as shown and preferred in FIG. 1, and as previously mentioned, is conventional and is operatively connected to analog video recorder/reproducer 16.

Referring now to FIG. 2, the video image processor 12 of the present invention is shown in greater detail. This video image processor 12 is preferably similar to a conventional image processor, such as the Comtal Vision ONE/20 image processor, but has been modified in a manner to be described in greater detail hereinafter to enable its use for processing of color video information provided at a video frame rate which can be interacted with in real time, such as via the keyboard 50, track ball 52 or data tablet 54, in a 4:3 aspect ratio. Thus, except as otherwise described, the various portions of the image processor 12 are preferably identical with corresponding portions commercially available from Comtal in the Comtal Vision ONE/20 and will not be described in greater detail. The image processor 12 is preferably a RAM refresh memory system which affords user access to a data base which ultimately preferably provides a 4:3 or 640 by 488 by 8 bit active pixel configuration. As shown and preferred in FIG. 2, this may be achieved by providing a 1,024 by 512 by 8 bit data base and appropriately conventionally modifying this data base by either software or appropriate hardware to provide the 640 by 488 by 8 bit pixel configuration. If such a configuration is readily available in memory, then such configuration may be substituted for the modified 1,024 by 512 by 8 bit data base. As is shown and preferred in FIG. 2, such a 640 by 488 active pixel configuration is provided for each of the three color component images, namely the red, blue and green, which is diagrammatically illustrated in FIG. 2 by reference numerals 70, 72 and 74 for the refresh memory 76. As also shown and preferred in FIG. 2, the image processor 12 also enables graphics overlay by providing four one bit graphics, with these graphics being in the same preferred 4:3 aspect ratio, with each graphics preferably being 640 by 488 by 1 bit. These graphics are diagrammatically represented in FIG. 2 by reference numeral 78. As used throughout the specification and claims, it should be noted that the term real time refers to operation at the video frame rate. The input to the refresh memory 76 is preferably conventionally handled by three separate input/output video cards 80, 82 and 84, with one such video card being provided for each of the three red, blue and green color video components. Each of these video cards 80, 82 and 84 preferably comprises a digitizer which converts the analog color video component signals into their digital equivalents for processing by the image processor 12. The actual processing in the image processor 12 is preferably handled by a conventional pipe line processor 86, such as the type provided in the Comtal Vision One/20 with each of the three color video component images, that is the red, blue and green, preferably being simultaneously separately processed in the processor 86 as three separate 8 bit streams of data. This conventional pipe line processor 86 preferably contains look-up tables, and function memories which enable treatment of the video images on a single pixel or group of pixels level in accordance with the desires of the user. Since this information may be provided at the video frame rate it, accordingly, may also be treated at the video frame rate in real time interaction dependent on the desires of the user expressed through means of the keyboard 50, track ball 52 and/or data tablet 54. Further information with respect to the functioning and operation of such a conventional pipe line processor 86 may be obtained by reference to technical information provided with the Comtal Vision ONE/20 image processor. The image processor 12 also preferably includes an overlay control 88 which preferably is similar to that commercially available in the Comtal Vision ONE/20 with the exception that the overlay control 88 has been conventionally modified to include three frame/write data paths to enable the aforementioned simultaneous processing of the red, blue and green color video components with the overlay control 88, of course, also being modified to effect the aforementioned preferred 4:3 aspect ratio timing. This overlay control 88 preferably has numerous functions such as cursor/target definition, pseudo color implementation and final display priority commands similar to these functional controls which are effected in the Comtal Vision ONE/20 by the conventional overlay control card provided therein. The major function of the overlay control 88 is preferably to develop the proper priority selection for ultimate display on a per pixel basis. This priority selection must preferably take place within a single pixel display time and must preferably be switchable interactively at the video frame rate, which is preferably 30 times per second, within the retrace and flyback times of the synchronization system in order to avoid any flicker or other noticeable image distortion. It should be noted that the refresh memory 76 is preferably controlled by the random access memory control card 90, the refresh memory control card 92 and the frame/write multiplex control card 94, with random access memory control card 90 preferably being identical to that provided in the Comtal Vision ONE/20 as is also true with respect to the refresh memory control card 92 except for a modification in the timing circuitry to effect a 4:3 aspect ratio, so as to provide the correct blanking times associated therewith, and with the frame/write multiplex card 94 also preferably being identical to that conventionally available in the Comtal Vision ONE/20 except for corresponding conventional software changes to accommodate the preferred 4:3 aspect ratio timing. In addition, as shown and preferred in FIG. 2, an external master sync 96 for controlling the operation of the processor 12 is provided to the system via an input to the frame/write multiplex card 94. This master sync signal 96 is preferably the sync signal provided from decoding of the composite analog color video signal provided via path 22 with this sync signal via path 96 being the sync output of decoder 20. The processed red, blue and green 8 bit data streams which are provided as outputs from the overlay control 88, are preferably provided to a conventional digital-to-analog converter 100 which is driven by the system computer bus 102 to provide separate analog color video component output signals, the red, blue and green color video component signals, as well as a sync signal, with these signals being provided via paths 30, 32, 33 and 34. These output signals represent the processed analog video component signals which are provided as the inputs to the conventional encoder 36 for encoding into the composite processed analog color video signal which is provided via path 38 to the video switcher 40.

As is also shown and preferred in FIG. 2, a conventional ancillary device card 104, such as conventionally provided in the commercially available Comtal Vision ONE/20, is provided for interfacing the real time interactive devices 50, 52 and 54 with the image processor 12 through the overlay control 88. As is also shown and preferred, the overlay 88 through a conventional three 8 bit data stream feedback bus 106 to the frame/write multiplex card 94 enables the actual viewed imagery to be read back into the refresh memory 76 in one frame time, such as 1/30 second based on a video frame rate of 30 frames per second. This feedback permits iterative processing with the pipe line processor tables and image combination circuits all updateable at the video frame rate of 30 times per second. As is true with respect to the commercially available Comtal Vision ONE/20, the image processor 12 is preferably controlled by a small system computer 110, such as a commercially available LSI-11, through which firmware commands are initiated thereby allowing user interaction via the aforementioned keyboard 50, track ball 52 or data tablet 54. The aforementioned firmware comprises the conventional LSI-11 program memory 112 which is provided with the system computer 110. The programming of the system computer 110 to accomplish its control functions is conventional and is of the type employed in the Comtal Vision ONE/20 system with the exception that the software is conventionally modified to accommodate for the presently preferred 640 by 488 active pixel configuration and the parallel processing of the three separate red, blue and green color video image components. As is also shown and preferred in FIG. 2, the annotation output is directly provided to the separate black and white monitor 46 for enabling separate monitoring of the annotation commands on monitor 46 and the processed video information on monitor 44. The processed analog video output signal may be recorded on the analog video recorder/reproducer 16 for future use, as will be explained in greater detail hereinafter, and/or may be temporarily stored on the digital video recorder/reproducer 14 if single frame processing is being accomplished.

Now describing the presently preferred interactive video production method of the present invention. The presently preferred video production method of the present invention shall be described in terms of the presently preferred method of providing real time video production at the video frame rate, such as for image correction which includes color correction, intensity correction and editing within the frame, single frame video production in situations where real time video production becomes complex, such as where small area correction of a video frame is desired, and single frame video production per se, such as for use in animation. These various exemplary approaches illustrate the full range of flexibility of the presently preferred video production method and system of the present invention. In addition to the above, the presently preferred video production method and system of the present invention may also be used in many other areas, such as special effects, rotoscoping of video images which could be accomplished electronically as well as many other applications of the presently preferred system and method of the present invention which will readily occur to one of ordinary skill in the art based on the flexibility of the presently preferred system and method.

Initially, the presently preferred system and method of the present invention shall be described in terms of real time video production, that is video production at the video frame rate. For example, if it is desired to change a particular color component of a scene such as the color of the clothing of a person appearing in a scene, this may be accomplished by first locating the desired portion of the scene in which the color is to be changed by means of the data tablet 54. Thereafter the user would request from the image processor 12 the particular assignment value of the color of that portion which has been located by means of data tablet 54, with this request being handled via the keyboard 50 input, and thereafter the user would input through the keyboard 50 the desired color values for that portion of the scene. Under such circumstances, when the video tape which was contained on the analog video recorder/reproducer 16 was input through the image processor 12 at the video frame rate, with such information being input to processor 12 through the video switcher 40 and thereafter through the decoder 20 which would decode the recorded analog composite video into its red, blue and green color video components as well as sync, wherever that corrected color or substituted color appeared in a scene the new color would appear in any portion of the scenes being input at the video frame rate where the previously identified color appeared. Under such circumstances, only the corrected or substituted color which had been identified would be altered without any other change on a color basis being made to any other color in the scene. The same procedure could be employed for multiple colors since each of the scenes is treated on a pixel by pixel basis. The user in manipulating or treating these colors would preferably employ the color monitor 44 in order to visualize what results are being achieved by the presently preferred video production method during processing. In addition, the aforementioned values with respect to the color changes would appear on the annotation monitor 46. The treated video tape information which would be output from the image processor 12 in terms of the processed red, blue and green color video components via paths 30, 32 and 34 as well as sync via path 30 are then provided to the encoder 36 whose output is, in turn, the composite processed analog color video signal provided via path 38, which is preferably an NTSC compatible video output signal such as one having 525 total scan lines at a video frame rate of 30 frames per second. This composite processed color video signal provided via path 38 is then routed by switcher 40 back to an analog video tape recording device for permanent storage of this processed video information.

Another example of the type of real time interactive video production which can be accomplished with the presently preferred system and method of the present invention relates to the real time combination of different images from different sources, again taking advantage of the pixel by pixel treatment of the system and method of the present invention. This technique, as will be described hereinafter, is different from chroma keying which depends on the use of specific colors to separate images from the background. No such type of color separation is required in the presently preferred method of the present invention. Thus, for example, the input information to the processor 12 can be provided by a plurality of analog tape decks 16 with each tape deck containing the image information to be combined. Thus, if it is desired to combine an airplane with a background scene where the scene with respect to the airplane has been shot with a different background, the scene containing the airplane with background to be changed is first provided to the image processor 12 and the background is eliminated through the use of the keyboard 50. The residual image remaining is the airplane alone. This residual image, which has been output to encoder 36 is then preferably rerecorded on an analog video storage device 16. The rerecorded residual image is then input to the image processor 12 through decoder 20 along with the separately recorded scene of the desired background provided from a separate analog tape deck 16. The user then, via the keyboard 50, indicates to the image processor 12 that the residual airplane image has priority as the foreground. This is within the software capability of the commercially available Comtal Vision ONE/20. The image processor 12 then combines the two scenes blanking out the portions of the background which are visually overlaid by the residual image of the airplane. This combining function may be visually observed by the user on the color monitor 44 with the combination of images occurring at the video frame rate as the two separately recorded video tapes are being simultaneously input to the image processor 12 at the video frame rate. This combined image is, thereafter, output at the video frame rate to encoder 36 and thereafter through video switcher 40 to an analog storage device for permanent recording of the processed video information. Again, it should be noted that the aforementioned real time interaction which enables the electronic combination of previously separately recorded images is accomplished on a pixel by pixel basis. In the instance of prior art chroma keying, the decision must be made in advance of the recording of the information, that is the decision to combine images; whereas in the presently preferred method of the present invention no such restriction is required and any prerecorded scene, irrespective of a prior decision with respect to chroma content, may be combined.

If it is desired to isolate a portion of the frame so as to eliminate an image from the scene, this may be accomplished on a frame by frame basis where only a small area of the scene is to be treated. An example of circumstances under which such treatment is desired is where an unwanted image inadvertently appears in a scene. Under normal circumstances, the entire scene must be retaken at considerable cost. However, with the presently preferred method of the present invention that portion of the scene can be eliminated and the correct background or other video information substituted therefor. This treatment is accomplished in the following manner. The first step in the presently preferred method would be to transfer that portion of the video tape which contains the unwanted information to the digital video recorder 14. The digital video recorder 14, which as was previously mentioned, is conventional, includes its own associated keyboard. The user utilizes this keyboard to retrieve a single frame of video information from video recorder 14. This single frame of information is routed through switcher 40, through decoder 20 and is input to the image processor 12 where it is displayed on the color monitor 44. The data tablet 54 is then employed to outline the specific area of the frame being displayed which is to be altered. The keyboard 50 is then employed to inform the image processor 12 to eliminate the video information contained in that designated area. If the unwanted image is located in the background, the keyboard 50 may also be employed to inform the image processor 12 to electronically extend the background to cover the eliminated area. If it is desired to substitute another image for the unwanted image rather than to merely extend the background, then the information to be substituted can be separately input to the image processor 12 and electronically conformed to the shape of the area being eliminated. All of the above three features are within the software capabilities of the commercially available Comtal Vision One/20. The combination of the substituted image may thereafter be accomplished in the same manner previously described above with respect to the combination of images. In addition to providing substitution or combination images to the processor 12 from a separate recording device, this information can also be provided from a color video camera 42 or 42a if it is desired to combine or substitute live information with previously recorded information. This can be accomplished by temporarily storing the live image provided from camera 42 or 42a in the video cards 80, 82 and 84 with the single frame of information being provided from video recorder 14 being stored in the refresh memory 76. This is possible due to the presence of the feedback loop 106 which enables the processor 12 to also function as a frame grabber.

Another example of the advantages of single frame treatment in the presently preferred video production method of the present invention is when it is desired to relocate an image previously recorded in a scene to a different portion of the scene. In order to accomplish this, the image to be moved is outlined with the data tablet 54 and a new target location in the scene is selected with the track ball 52. The keyboard 50 is then employed to inform the image processor 12 to move the outlined image indicated by data tablet 54 to the new target location indicated by track ball 52. This is within the software capabilities of the commercially available Comtal Vision One/20. The single frame of information which has been provided from video recorder 14 and which has now been processed is then output through encoder 36 and routed through switcher 40 for subsequent rerecording back onto the video recorder 14. This processed single frame information which has been treated on a frame by frame basis from recorder 14 is then subsequently rerecorded on an analog recorder 16 for permanent storage of the processed information. The same type of image relocation technique can be employed in creating special effects, such as by separating an image into its component portions which can be relocated to different portions of the scene on a frame by frame basis, such as for example if it is desired to create the visual illusion of an explosion. Again, this is facilitated by the treatment of the image on an active pixel by pixel basis which enables the relocation of the portions of the image on such a pixel by pixel basis.

As was previously mentioned, another example of the flexibility of the presently preferred method of the present invention is in connection with animation. In employing such a technique, previously drawn black and white cels may be input to the image processor 12, such as by means of the color video camera 42a, with each of the cels being temporarily stored in the refresh memory 76. The animator may then outline the designated areas to be colored by use of the data tablet 54 or may locate target areas for coloring by means of the track ball 52 with the animator observing the cel to be treated on the color monitor 44. The keyboard 50 is then employed to select the desired color for the designated area and to inform the image processor 12 to assign that color to the designated area, as was previously mentioned with respect to color correction. This technique is accomplished for the entire scene on a frame by frame basis with each frame then being output through encoder 36 and video switcher 40 for recording on the digital video recorder 14 until the entire process has been completed. Thereafter the processed information recorded on digital video recorder 14 is provided to the analog video recorder 16 at the video frame rate for permanent storage of the completed color animation. This processed animated analog video information which has been recorded on recorder 16 can now be combined with other recorded analog information either live or prerecorded in the same manner previously described above with respect to the combination of images.

Summarizing the presently preferred method of the present invention, the information to be interactively treated on a real time basis is retrievably stored as a composite analog color video signal which is provided at the real time video frame rate through decoder 20 to the image processor 12. The image processor 12 then digitizes the separately provided red, blue and green analog video output signals and digitally processes these signals in a 4:3 aspect ratio configuration of active pixels, such as the aforementioned 640 by 488 by 8 bit configuration. The keyboard 50, track ball 52 and data tablet 54 are employed to enable the real time interactive control of this digital processing on an active pixel by pixel basis. As a result of this interactive processing, the processed video information is reconverted to corresponding analog video signals, thereafter encoded and rerecorded for permanent storage. When it is desired to treat the information on a single frame basis, the information is recorded on a digital video recorder and is then provided to the image processor 12 on a frame by frame basis. After the image treatment is completed, the information is then recorded on the analog recorder at the video frame rate.

By utilizing the presently preferred method and system of the present invention the video characteristics of the active pixels forming each video frame may be interactively controlled during video production both at a real time or video frame rate as well as on a single frame basis, depending on the desired application, with all of these applications coming within the flexibility of the presently preferred system and method of the present invention. Numerous changes and modifications to the previously described method and system of the present invention may be made without departing from the spirit and scope thereof since the aforementioned system and method are creative tools which by their very nature will suggest alterations and combinations in the various techniques described above.

What is claimed is:

1. An interactive video production system comprising an analog video storage means capable of retrievably storing a composite analog color video signal, said composite analog color video signal having red, blue and green analog video components and having an associated video information content, said analog video storage means being capable of retrievably providing said composite analog color video signal as a video output signal at a real time video frame rate; decoding means operatively connected to said analog video storage means for receiving said retrievably provided composite analog color video signal and for decoding said composite signal into said red, blue, and green analog video components each having said associated video information content, said decoding means being capable of providing said decoded red, blue and green analog video components as separate red, blue and green analog video output signals at said real time video frame rate; real time video image processing means operatively connected to said decoding means for receiving said provided separate red, blue and green analog video output of signals at said video frame rate, said video image processing means comprising means for digitizing said provided separate red, blue and green analog video output signals and for digitally processing each of said digitized red, blue and green analog video output signals at said video frame rate in a 4:3 aspect ratio configuration of active pixels defining a picture image area of active picture elements; real time interactive means operatively connected to said video image processing means for enabling real time interactive controllable digital processing of said associated video information content of each of said digitized red, blue and green analog video output signals on an active pixel-by-pixel basis within said picture image area by said video image processing means, said real time interactive controllable digital processing being at said video frame rate, said video image processing means further comprising means for providing corresponding red, blue and green analog video output signals from said interactively controllably digitally processed red, blue and green video output signals, each of said video output signals solely containing said 4:3 aspect ratio of active pixels defining a picture image area; and encoding means operatively connected to said video image processing means for receiving said corresponding red, blue and green analog video output signals and for providing a broadcast compatible composite interactively processed analog color video signal therefrom, said provided composite color video signal solely containing said 4:3 aspect ratio configuration of active pixels defining a picture image area; whereby the video characteristics of each of the active pixels forming each video frame may be interactively controlled during video production at the video frame rate.

2. An interactive video production system in accordance with claim 1 wherein said decoding means comprises means for providing an NTSC decoded output for said decoded red, blue and green analog video output signals.

3. An interactive video production system in accordance with claim 2 wherein said encoding means comprises means for providing an NTSC encoded output for said composite interactively processed analog color video signal.

4. An interactive video production system in accordance with claim 1 wherein said encoding means comprises means for providing a broadcast compatible NTSC encoded output for said composite interactively processed analog color video signal.

5. An interactive video production system in accordance with claim 4 wherein said NTSC encoding means further comprises means for providing an NTSC broadcast compatible video output signal having said associated 4:3 aspect ratio picture as said composite interactively processed analog color video signal.

6. An interactive video production system in accordance with claim 5 wherein said provided NTSC broadcast compatible video output signal comprises 525 total scan lines at 30 frames per second.

7. An interactive video production system in accordance with claim 1 wherein said analog video storage means comprises an analog video tape recorder means.

8. An interactive video production system in accordance with claim 1 wherein said encoding means further comprises means for providing an NTSC broadcast compatible video output signal having said associated 4:3 aspect ratio picture as said composite interactively processed analog color video signal.

9. An interactive video production system in accordance with claim 8 wherein said provided NTSC broadcast compatible video output signal comprises 525 total scan lines at 30 frames per second.

10. An interactive video production system in accordance with claim 1 wherein said video image processing means digitizing means comprises analog-to-digital converter means.

11. An interactive video production system in accordance with claim 1 wherein said video image processing means corresponding analog signal providing means comprises digital-to-analog converter means.

12. An interactive video production system in accordance with claim 1 wherein said system further comprises separate annotation command video display means and processed video image display means operatively connected to said video image processing means for separately displaying annotation commands while monitoring the video image being processed.

13. An interactive video production system in accordance with claim 1 wherein said video image processing means 4:3 aspect ratio configuration comprises a 640-by-488 active pixel configuration.

14. An interactive video production system in accordance with claim 1 wherein said analog video storage means comprises means for recording said composite interactively processed analog color video signal.

15. An interactive video production system in accordance with claim 1 wherein said system further comprises digital video storage means capable of retrievably storing single video frames of a composite color video signal having red, blue and green video components for subsequent single frame processing by said image processing means, said decoding means being operatively connected between said digital video storage means and said video image processing means for decoding said single frame composite color video signal into said red, blue and green video components for enabling said interactive controllable digital processing thereof by said video image processing means.

16. An interactive video production system in accordance with claim 15 wherein said system further comprises video switching means operatively connected between said analog and digital storage means and said encoding and decoding means for enabling the controllable routing of video signals in said system.

17. An interactive video production system in accordance with claim 16 wherein said video switching means comprises means for providing a sync reference for said system.

18. An interactive video production system in accordance with claim 1 wherein said system further comprises video switching means operatively connected between said analog storage means and said encoding and decoding means for enabling the controllable routing of video signals in said system.

19. An interactive video production system in accordance with claim 18 wherein said video switcher means comprising means for providing a sync reference for said system.

20. An interactive video production system in accordance with claim 1 wherein said system further comprises a color video camera means operatively connected to said video image processing means for providing a live color video input signal thereto, said color video camera means providing separate red, blue and green live analog video output signals to said video image processing means representative of corresponding red, blue and green analog video components of a live composite analog color video signal, said provided separate red, blue and green live analog video output signals being digitized by said video image processing means for enabling said interactive controllable processing thereof for providing said composite interactively processed analog color video signal.

21. An interactive video production system in accordance with claim 20 wherein said analog video storage means comprises means for recording said composite interactively processed analog color video signal.

22. An interactive video production system in accordance with claim 1 wherein said real time interactive means comprises keyboard means.

23. An interactive video production system in accordance with claim 1 wherein said real time interactive means comprises data tablet means.

24. An interactive video production system in accordance with claim 1 wherein said real time interactive means comprises trackball means.

25. An interactive video production system in accordance with claim 1 wherein said digital processing means comprises means for simultaneously digitally processing said red, blue and green video output signals.

26. An interactive video production method comprising the steps of retrievably storing a composite analog color video signal, said composite analog color video signal having red, blue and green analog video components and having an associated video information content, said retrievably stored composite analog color video signal being provided as a video output signal at a real time video frame rate; decoding said provided composite signal into said red, blue and green analog video components each having said associated video information content, and providing said decoded red, blue and green analog video components as separate red, blue and green analog video output signals at said real time video frame rate; digitizing said provided separate red, blue and green analog video output signals and digitally processing each of said digitized red, blue and green analog video output signals at said video frame rate in a 4:3 aspect ratio configuration of active pixels defining a picture image area of active picture elements; real time interactively controllably digitally processing said associated video information content of each of said digitized red, blue and green analog video output signals on an active pixel-by-pixel basis within said picture image area at said video frame rate; providing corresponding red, blue and green analog video output signals from said interactively controllably digitally processed red, blue and green video output signals, each of said provided video output signals solely containing said 4:3 aspect ratio of active pixels defining a picture image area; and encoding said corresponding red, blue and green analog video output signals for providing a broadcast compatible composite interactively processed analog color video signal therefrom, said provided composite color video signal solely containing said 4:3 aspect ratio configuration of active pixels defining a picture image area, whereby the video characteristics of each of the active pixels forming each video frame may be interactively controlled during video production at said video frame rate.

27. An interactive video production method in accordance with claim 26 wherein said decoding step comprises the step of providing an NTSC decoded output for said decoded red, blue and green analog video output signals.

28. An interactive video production method in accordance with claim 27 wherein said encoding step comprises the step of providing a broadcast compatible NTSC encoded output for said composite interactively processed analog color video signal.

29. An interactive video production method in accordance with claim 26 wherein said encoding step comprises the step of providing a broadcast compatible NTSC encoded output for said composite interactively processed analog color video signal.

30. An interactive video production method in accordance with claim 29 wherein said NTSC encoding step further comprises the step of providing an NTSC broadcast compatible video output signal having said associated 4:3 aspect ratio picture as said composite interactively processed analog color video signal.

31. An interactive video production method in accordance with claim 26 wherein said encoding step further comprises the step of providing an NTSC broadcast compatible video output signal having said associated 4:3 aspect ratio picture as said composite interactively processed analog color video signal.

32. An interactive video production method in accordance with claim 26 wherein said method further comprises the step of separately displaying annotation commands while monitoring the video image being processed.

33. An interactive video production method in accordance with claim 26 wherein said method further comprises the step of recording said composite interactively processed analog color video signal.

34. An interactive video production method in accordance with claim 26 wherein said method further comprises the step of retrievably digitally storing single video frames of a composite color video signal having red, blue and green video components; decoding said single frame composite color video signal into said red, blue and green video components for enabling said interactive controllable digital processing thereof; and interactively controllably digitally processing said decoded single frame composite color video signal for providing said composite interactively processed analog color video signal therefrom.

35. An interactive video production in accordance with claim 26 wherein said method further comprises providing separate red, blue and green live analog video output signals representative of corresponding red, blue and green analog video components of a live composite analog color video signal; digitizing said provided live analog video output signals; and interactively controllably digitally processing said digitized live signals for providing said composite interactively processed analog color video signal.

36. An interactive video production method in accordance with claim 26 wherein said digital processing step comprises the step of simultaneously digitally processing said red, blue and green video output signals.

* * * * *